July 8, 1941.  F. PETROVIC  2,248,688

CANDY MAKING MACHINE

Filed April 10, 1941  2 Sheets-Sheet 1

Inventor

Frank Petrovic

By Mason Fenwick & Lawrence

Attorneys

July 8, 1941.  F. PETROVIC  2,248,688
CANDY MAKING MACHINE
Filed April 10, 1941  2 Sheets-Sheet 2
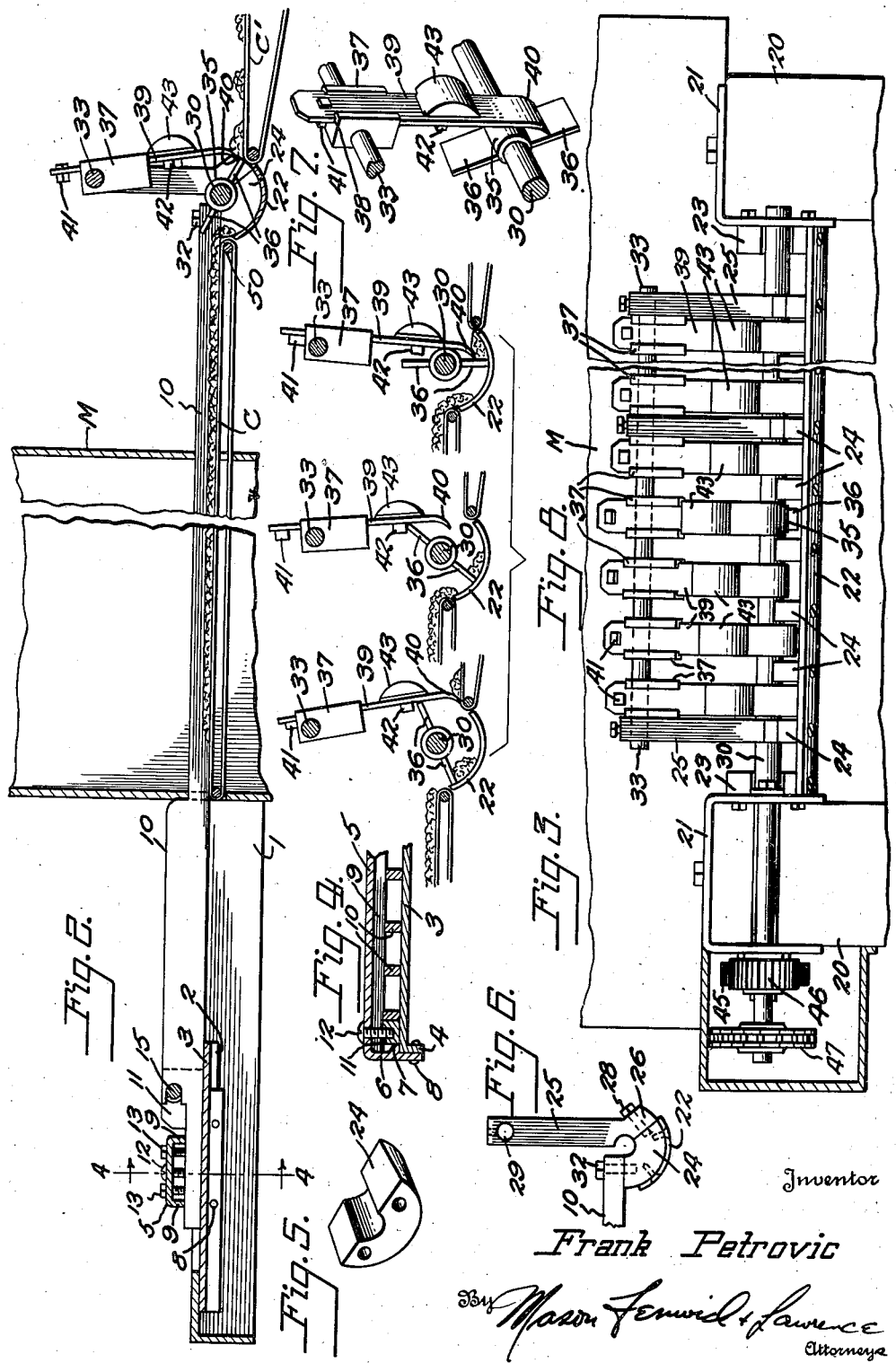
Inventor
Frank Petrovic Patented July 8, 1941

2,248,688

UNITED STATES PATENT OFFICE 2,248,688

CANDY MAKING MACHINE

Frank Petrovic, Ottumwa, Iowa

Application April 10, 1941, Serial No. 337,971

9 Claims. (Cl. 107—4)

This invention relates to candy making machines and more particularly to an improvement for that type of candy making machine used in connection with the manufacture of chocolate-coated nuts, raisins or the like in irregular shaped clusters.

The present invention is directed to attachments adapted to sever individual clusters from a continuous stream and properly space such clusters on an endless cooling conveyor.

One of the objects of the invention is to provide such an attachment of improved and simplified structure readily associated with known candy machines of the general character indicated by means of which individual clusters can be severed from a plurality of advancing streams of confection and compactly spaced on a cooling conveyor.

Other objects will more particularly appear in the course of the following detailed description.

Two sheets of drawings accompany this specification as part thereof, in which like reference characters indicate like parts throughout.

Figure 2 is a vertical cross section through a similar diagrammatic view of a candy mixing machine showing the improved attachment applied thereto.

Figure 3 is a fragmentary end view of the machine showing the severing and transfer device.

Figure 4 is a fragmentary vertical cross section taken on line 4—4 of Fig. 2.

Figure 5 is a detailed perspective of a spacer element.

Figure 6 is a side elevation of a spacer and pedestal unit.

Figure 7 is a perspective view of a cutter and shover unit.

Figure 8 is a diagrammatic view showing three phases of operation of a cutter and shover combination.

Figure 1:
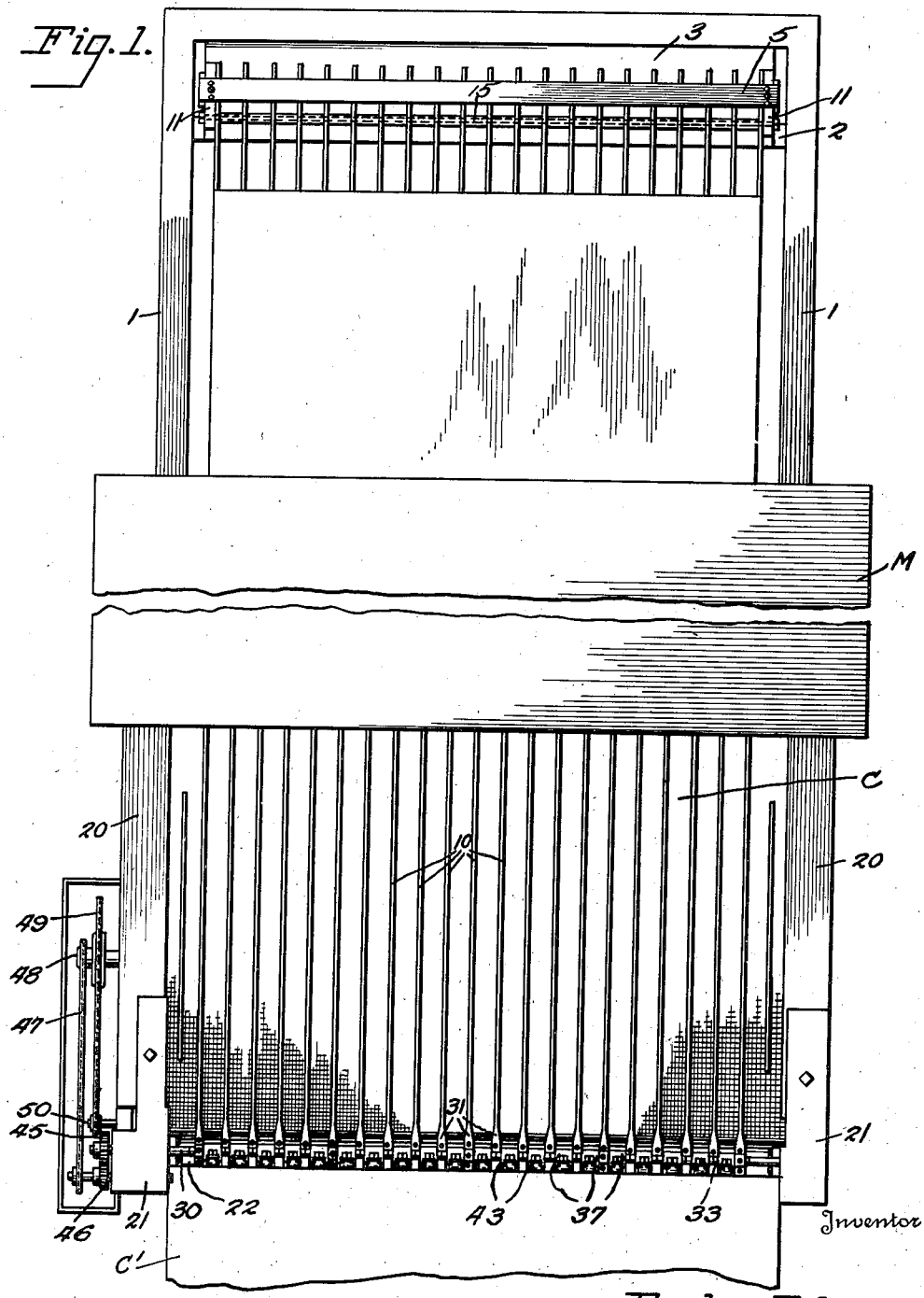
Figure 1 is a plan view largely diagrammatic, showing the application of the improved attachments to a candy making machine.

The candy machine to which the present invention is directed as an attachment is indicated generally by the housing M through which extends horizontally an endless conveyor C upon which the machine is designed to deposit a plurality of laterally spaced streams of a mixture of nuts, fruits and the like, with chocolate intended to be transformed ultimately into a plurality of small irregular shaped clusters of nuts or fruit surrounded by chocolate.

The present invention consists essentially of providing a plurality of spacer fingers positioned over the upper face of the endless conveyor C so as to mechanically separate these streams of confection and prevent any possibility of their intermingling while they are in their most fluid state.

A second cooling conveyor C' is arranged in longitudinal alignment with the conveyor C but spaced slightly therefrom and an improved and simplified cutter and transfer device is positioned intermediate the delivery conveyor C and the cooling conveyor C' adapted to sever the streams of confection into individual units and transfer such units from the delivery conveyor on to the cooling conveyor in closely spaced relationship so that they will cool on the latter conveyor into individual candy units.

Referring to the drawings, 1—1 represents horizontally disposed frame members extending to the rear of the candy machine M, which frame members support a transverse supporting member 2 upon which is seated a shelf 3 having down-turned end flanges 4 adapted to seat against and be secured by bolts 8 to the down-turned end flanges 6 of a clamp 5 which extends between the frame members 1—1. The ends 6 of the clamp 5 are preferably formed with an inwardly directed flange 7 adapted to seat on the shelf 3 and down-turned side flanges 9, the lower edge of which engages upon the longitudinally extending spacing fingers 10 at their rear end to secure such spacing fingers 10. On each side of the clamp 5 are positioned end brackets 11 engaged by spaced screws 12 and 13 in clamp 5, which end brackets 11 support a transverse rod 15 adapted to engage rearwardly opening notches formed in fingers 10. The end brackets 11 can be angularly adjusted within narrow limits by means of the screws 12—13.

The fingers 10 extend through the candy machine M separating the conveyor C into a plurality of laterally spaced channels adapted to receive the streams of confection. The forward ends of the fingers 10 are flattened as at 31 and secured as by bolts 32 to spacer members 24 in the cutter and transfer device hereinafter described.

The cutter and transfer device comprises a segmental trough 22 secured at each end to segmental disks 23, which are secured to the sides of brackets 21 secured to the forward ends of side frame members 20—20 supported by the candy machine frame. A plurality of segmental spaced members 24 are similarly secured in trough 22, each of these segmental spacing members being formed with a segmental bearing surface to support a shaft 30.

Some of the spacer members 24 carry pedestals 25 provided with obliquely offset feet 26, adapted to be secured as by bolts 28 to the spacers 24 and provided at their upper ends with bearings 29 for a transversely extending shaft 33 upon which are pivotally mounted a plurality of wiper or pusher members 37.

Fixedly secured to shaft 30 intermediate the spacer members 24 are rotary cutter and shover members, each consisting of a hub 35 and radially directed vanes 36—36, which vanes are proportioned to contact and wipe the inner face of trough 22 and span the upper edges of said trough. The pusher 37 is formed with a slideway 38 in which is slidably positioned a blade 39 having its lower end curved as at 40. The stroke of blade 39 is limited by a bolt stud 41 at the top and a second bolt stud 42 below the slideway which better bolt secures to the blade an offset weight 43 operating to force the blade downwardly so that its curved end 40 will contact the vanes of the rotary cutter and shover. The operation of the blade 39 with the rotary cutter vanes is illustrated in sequence in Figure 8 from which it will be noted that ascending vane from which the blade has pushed a confection onto belt C', is about to contact bolt 42 and lift blade 39. The next view to the right shows the blade 39 lifted while the last view to the right shows the blade dropped into contact with the next vane.

The oppose vane 36 descending against the approach-stream of confection cuts off a unit which is wiped around the upper surface of trough 22 until removed from the vane by blade 39. By staggering the position of the rotary cutters angularly on the shaft 30 the confections from alternate streams can be staggered with respect to the intermediate streams so as to effect a compact arrangement of the confections on cooling conveyor C'.

The shaft 30 carrying the rotary cutter and transfer vanes 36 is rotated through gear 45 secured thereon meshed with gear 46, which is in turn rotated through chain 47 from shaft 48 provided on the candy machine for the operation of conveyor C through the chain 49 and gear 50. By this arrangement the speed of the rotary cutters is synchronized with the speed of conveyor C.

With the attachments as described, it will be apparent that the flow of confection streams from the candy machine M can be quite rapid and the whole speed of the machine greatly increased by the severing and removal of the confection units at the end of the delivery belt C.

Various modifications in the precise construction and arrangement of parts will readily suggest themselves to those skilled in the art but all within the scope of the present invention as claimed.

Having thus fully described my invention, I claim:

1. In a candy making machine having a candy receiving conveyor on which the plastic confection is deposited in a plurality of laterally spaced streams and a cooling conveyor aligned with the receiving conveyor to carry the confections away, common means for severing the streams into unit confections and spacing the confections in the direction of travel on the cooling conveyor.

2. The device of claim 1 in which the severing and spacing means comprises a segmental trough and a plurality of rotary vanes arranged to sweep transversely of the trough.

3. The device of claim 1 in which the severing and spacing means comprises a segmental trough extending intermediate and transversely of the conveyors with a rotary vane device aligned with each of the spaced channels to sever the spaced streams into individual confections and sweep the confections from said channels transversely the trough and onto the cooling conveyor.

4. The device of claim 1 in which the severing and spacing means comprises a segmental trough extending intermediate and transversely of the conveyors, with a rotary vane device aligned with each of the spaced channels to sever the streams into individual confections and sweep the confections onto the cooling conveyor, the vanes of said devices being arranged in staggered angular relation alternately to effect staggering of alternate longitudinal rows of confections with respect to the intermediate rows.

5. A confection cutting and transfer device for use in connection with aligned conveyors comprising a trough member, a rotary member having radially disposed vanes arranged to sweep the trough member transversely to its axis and a pivoted wiper adapted to engage the vanes successively and to be rocked thereby.

6. A device as specified in claim 5 in which the pivoted wiper is biased toward the axis of the rotary member.

7. A device as specified in claim 5 in which the pivoted wiper has its free end angularly disposed as a shover.

8. A device as specified in claim 5 in which the pivoted wiper has its free end angularly disposed as a shover with weighting means for rocking it toward the axis of the rotary vaned member.

9. A device as specified in claim 5 in which the pivoted wiper comprises a pivoted body formed with a slideway, a blade having a curved end slidable in the body and means on the blade adapted to engage a vane of the rotary member.

FRANK PETROVIC.